US010425915B2

(12) United States Patent
Sheng et al.

(10) Patent No.: US 10,425,915 B2
(45) Date of Patent: Sep. 24, 2019

(54) RESOURCE POOL ACCESS FOR DEVICE TO DEVICE COMMUNICATIONS

(71) Applicant: Sharp Kabushiki Kaisha, Osaka (JP)

(72) Inventors: Jia Sheng, Vancouver, WA (US); Shohei Yamada, Osaka (JP); John Michael Kowalski, Camas, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/749,898

(22) Filed: Jun. 25, 2015

(65) Prior Publication Data

US 2015/0382324 A1 Dec. 31, 2015

Related U.S. Application Data

(60) Provisional application No. 62/018,208, filed on Jun. 27, 2014.

(51) Int. Cl.
*H04W 72/02* (2009.01)
*H04W 76/14* (2018.01)
*H04W 84/18* (2009.01)

(52) U.S. Cl.
CPC ........... *H04W 72/02* (2013.01); *H04W 76/14* (2018.02); *H04W 84/18* (2013.01)

(58) Field of Classification Search
CPC . H04W 76/023; H04W 76/043; H04W 72/02; H04W 72/0453
See application file for complete search history.

(56) References Cited

U.S. PATENT DOCUMENTS

| 9,002,281 | B2 * | 4/2015 | Fwu | H04W 72/02 |
| | | | | 370/328 |
| 9,084,241 | B2 * | 7/2015 | Madan | H04W 76/14 |
| 9,769,644 | B2 * | 9/2017 | He | H04W 8/005 |
| 9,807,800 | B2 * | 10/2017 | Sun | H04W 74/0833 |
| 9,826,522 | B2 * | 11/2017 | Chen | H04W 72/044 |
| 9,848,454 | B2 * | 12/2017 | Patil | H04W 76/14 |
| 9,974,066 | B2 * | 5/2018 | Novlan | H04W 72/042 |
| 2006/0036518 | A1 | 2/2006 | O'Neill | |
| 2007/0223428 | A1 | 9/2007 | Patterson et al. | |
| 2013/0109301 | A1 | 5/2013 | Hakola et al. | |
| 2013/0128823 | A1 | 5/2013 | Turtinen et al. | |
| 2013/0273923 | A1 | 10/2013 | Li et al. | |
| 2013/0288608 | A1 * | 10/2013 | Fwu | H04W 72/02 |
| | | | | 455/63.1 |

(Continued)

FOREIGN PATENT DOCUMENTS

| WO | 2013177449 | 11/2013 |
| WO | 2014/182342 A1 | 11/2014 |
| WO | 2015/003365 A1 | 1/2015 |

OTHER PUBLICATIONS

R1-142207, 3GPP TSG RAN WG1 Meeting #77, "Aspects of resource pool configuration for D2D communication", Sharp, Seoul, Korea, May 19-23, 2014. pp. 1-3.*

(Continued)

*Primary Examiner* — Ahmed Elallam
(74) *Attorney, Agent, or Firm* — Nixon & Vanderhye P.C.

(57) ABSTRACT

A wireless terminal comprising a processor configured to determine a set of plural pools of resources, to select a pool of resources from a set of plural pools of resources, and to transmit a sidelink direct transmission data using resources of the pool.

8 Claims, 9 Drawing Sheets

(56) References Cited

U.S. PATENT DOCUMENTS

| | | | |
|---|---|---|---|
| 2013/0308551 A1* | 11/2013 | Madan | H04W 76/023 370/329 |
| 2014/0094183 A1* | 4/2014 | Gao | H04W 72/048 455/450 |
| 2014/0126509 A1 | 5/2014 | You | |
| 2014/0328329 A1* | 11/2014 | Novlan | H04W 72/042 370/336 |
| 2015/0016355 A1 | 1/2015 | Yie et al. | |
| 2015/0043448 A1 | 2/2015 | Chatterjee | |
| 2015/0215903 A1 | 7/2015 | Zhao | |
| 2015/0264677 A1* | 9/2015 | He | H04W 72/02 370/312 |
| 2015/0271720 A1 | 9/2015 | Yamada | |
| 2015/0271841 A1 | 9/2015 | Yamada | |
| 2015/0271846 A1 | 9/2015 | Kowalski | |
| 2015/0319797 A1 | 11/2015 | Yamada | |
| 2015/0327240 A1 | 11/2015 | Yamada | |
| 2015/0339718 A1 | 11/2015 | Walton | |
| 2015/0341794 A1 | 11/2015 | Vanderveen | |
| 2016/0057604 A1* | 2/2016 | Luo | H04W 8/005 370/330 |
| 2016/0095092 A1 | 3/2016 | Khoryaev | |
| 2016/0095112 A1 | 3/2016 | Panteleev | |
| 2016/0135200 A1* | 5/2016 | Brahmi | H04W 4/06 370/329 |
| 2016/0219640 A1* | 7/2016 | Jung | H04W 76/14 |
| 2016/0234718 A1 | 8/2016 | Thangarasa | |
| 2016/0242152 A1* | 8/2016 | Yu | H04W 76/14 |
| 2016/0249198 A1 | 8/2016 | Kim | |
| 2016/0255615 A1* | 9/2016 | Chatterjee | H04W 36/0055 |
| 2016/0302215 A1* | 10/2016 | Sorrentino | H04W 76/023 |
| 2016/0338012 A1* | 11/2016 | Liu | H04W 76/27 |
| 2016/0381666 A1* | 12/2016 | Kim | H04W 52/0216 370/329 |
| 2017/0027011 A1* | 1/2017 | Chae | H04W 76/14 |
| 2017/0034822 A1* | 2/2017 | Chae | H04B 7/2656 |
| 2017/0041891 A1* | 2/2017 | Chae | H04W 56/00 |
| 2017/0188375 A1* | 6/2017 | Seo | H04W 72/085 |
| 2018/0176892 A1* | 6/2018 | Kim | H04W 72/0406 |

OTHER PUBLICATIONS

R1-142358, 3GPP TSG RAN WG1 Meeting #77,"Discussion of mode 2 resource allocation for D2D communication" ASUSTeK, Seoul, Korea, May 19-23, 2014.*

International Searching Authority, "International Search Report," issued in connection with PCT/US15/37650, dated Nov. 19, 2015.

International Searching Authority, "Written Opinion," issued in connection with PCT/US15/37650, dated Nov. 19, 2015.

R2-142829, 3GPP TSG-RAN2 Meeting #86, "Introduction of ProSe", Samsung, Qualcom Incorporation, Seoul, South Korea, May 19-23, 2014.

R1-141256, 3GPP TSG RAN WG1 Meeting #76bis, "Distributed Resource Allocation for D2D Communication", Alcatel-Lucent Shanghai Bell, Alcatel-Lucent, Shen Zhen, China, Mar. 31-Apr. 4, 2014.

R1-141546, 3GPP TSG RAN WG1 Meeting #76bis, Discussion on D2D Operation Outside of Network Coverage (Mode-2), Intel Corporation, Shenzhen, China, Mar. 31-Apr. 4, 2014.

R1-141859, 3GPP TSG RAN WG1 Meeting #76bis, "Way Forward on Discovery Signal Design and Network Assistance", NTT DOCOMO, Huawei, HiSilicon, Samsung, Sony, Sharp, ZTE, LG Electronics, Hitachi, ETRI, Media Tek, Shenzhen, China, Mar. 31-Apr. 4, 2014.

3GPP TS 23.303 V12.0.0 Technical Specification, $3^{rd}$ Generation Partnership Project; Technical Specification Group Services and Systems Aspects; Proximity-based Services (ProSe); Stage 2 (Release 12) (Feb. 2014).

R2-14XXX, 3GPP TSG RAN WG1 Meeting #87, Introduction of ProSe, Samsun, Dresden, German, Aug. 18-22, 2014.

U.S. Appl. No. 14/660,622, filed Mar. 17, 2015, entitled "Device-To-Device Communications Apparatus and Methods".

3GPP TS 36.331 V12.1.0 Technical Specification, $3^{rd}$ Generation Partnership Project; Technical Specification Group Radio Access Network; Evolved Universal Terrestrial Radio Access (E-UTRA); Radio Resource Control (RRC) Protocol Specification (Release 12) (Mar. 2014).

International Search Report and Written Opinion dated Jul. 12, 2016 in PCT Application No. PCT/US2016/026439.

3GPP TS 36.213 V12.4.0; Technical Specification; $3^{rd}$ Generation Partnership Project; Technical Specification Group Radio Access Network; Evolved Universal Terrestrial Radio Access (E-UTRA); Physical Layer Procedures (Release 12) (Dec. 2014).

R2-150734, 3GPP TSG-RAN2 #89 meeting; Samsung, "Introduction of ProSe", Athens, Greece, Feb. 9-13, 2015.

R2-150645, 3GPP TSG-RAN WG2 Meeting #89; Intel Corporation, Fujitsu, InterDigital, Huawei, HiSilicon, ZTE, "Corrections to Stage 2 Description of ProSe"; Athens, Greece, Feb. 9-13, 2015.

3GPP TS 23.303 V12.3.0; Technical Specification; $3^{rd}$ Generation Partnership Project; Technical Specification Group Services and System Aspects; Proximity-based Services (ProSe); Stage 2 (Release 12) (Dec. 2014).

3GPP TS 36.843 V12.0.1; Technical Report; $3^{rd}$ Generation Partnership Project; Technical Specification Group Radio Access Network; Study on LTE Device to Device Proximity Services; Radio Aspects (Release 12) (Mar. 2014).

International Search Report and Written Opinion dated Jul. 7, 2016 in PCT Application No. PCT/US2016/026320.

Office Action dated Sep. 8, 2016 in U.S. Appl. No. 15/092,788.

U.S. Appl. No. 15/092,988, filed Apr. 7, 2016, entitled Method and Apparatus for Sidelink Direct Discovery Resource Pool Allocation for Out-Of-Coverage Wireless Terminal.

U.S. Appl. No. 15/092,996, filed Apr. 7, 2016, entitled Method and Apparatus for Implementing Partial Coverage and Out-Of-Coverage Sidelink Discovery Resource Pools for Wireless Communications.

International Preliminary Report on Patentability dated Jan. 5, 2017 in PCT Application No. PCT/US2015/037650.

Office Action dated Oct. 11, 2016 is U.S. Appl. No. 15/092,996.

R1-141969 3GPP TSG-RAN WG1 #77, Qualcomm Incorporated, "Resource Allocation for Mod 2 D2D Broadcast Communication", Seoul, Korea, May 19-23, 2014.

R1-150962 3GPP TSG-RAN WG1 Meeting #80, Change Request, Athens, Greece, Feb. 9-13, 2015.

Notice of Allowance dated May 24, 2017 in U.S. Appl. No. 15/092,996.

R2-141223, 3GPP TSG RAN WG2 Meeting #85bis, Intel Corporation, "Resource allocation signaling for D2D communication", Valencia, Spain, Mar. 31-Apr. 4, 2014.

R1-140516, 3GPP TSG RAN WG1 Meeting #76, EADS, "Radio resource sharing between Public Safety groups using D2D", Prague, Czech Republic, Feb. 10-14 2014.

* cited by examiner

| GROUP CLASSIFICATION TYPES → | ACCESS CLASS | PRIORITY TYPE | SERVICE TYPE | ID |
|---|---|---|---|---|
| GROUPS ↓ | ACCESS CLASS 1 (GROUP AC1) | PRIORITY TYPE 1 (GROUP PT1) | SERVICE TYPE 1 (GROUP ST1) | ID 1 (GROUP ID1) |
| | ACCESS CLASS 2 (GROUP AC2) | PRIORITY TYPE 2 (GROUP PT2) | SERVICE TYPE 2 (GROUP ST2) | ID 2 (GROUP ID2) |
| | . . . | . . . | . . . | . . . |
| | ACCESS CLASS i (GROUP ACi) | PRIORITY TYPE j (GROUP PTj) | SERVICE TYPE k (GROUP STk) | ID n (GROUP IDn) |

*Fig. 2*

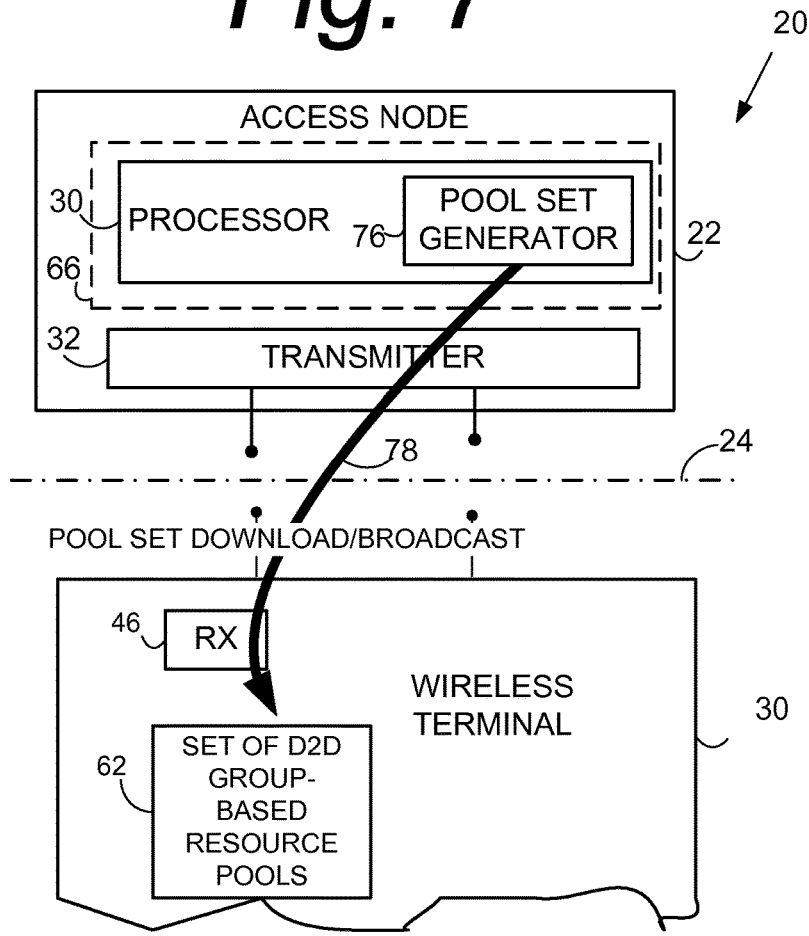

RESOURCE POOL ACCESS FOR DEVICE TO DEVICE COMMUNICATIONS

This application claims the priority and benefit of U.S. Provisional Patent Application 62/018,208, filed Jun. 27, 2014, which is incorporated herein by reference in its entirety.

TECHNICAL FIELD

The technology relates to wireless communications, and particularly to allocating or granting radio resources for wireless device-to-device (D2D) communications.

BACKGROUND

When two user equipment terminals (e.g., mobile communication devices) of a cellular network or other telecommunication system communicate with each other, their data path typically goes through the operator network. The data path through the network may include base stations and/or gateways. If the devices are in close proximity with each other, their data path may be routed locally through a node such as a local base station. In general, communications between a network node such as a base station and a wireless terminal is known as "WAN" or "Cellular communication".

It is also possible for two user equipment terminals in close proximity to each other to establish a direct link without the need to go through a base station. Telecommunications systems may use or enable device-to-device ("D2D") communication, in which two or more user equipment terminals directly communicate with one another. In D2D communication, voice and data traffic (referred to herein as "communication signals") from one user equipment terminal to one or more other user equipment terminals may not be communicated through a base station or other network control device of a telecommunication system. Device-to-device (D2D) communication has more recently also become known as "sidelink direct communication"

D2D communication, e.g., sidelink direct communication, can be used in networks implemented according to any suitable telecommunications standard. A non-limiting example of such as standard is the 3rd Generation Partnership Project ("3GPP") Long Term Evolution ("LTE"). The 3GPP standard is a collaboration agreement that aims to define globally applicable technical specifications and technical reports for third and fourth generation wireless communication systems. The 3GPP may define specifications for next generation mobile networks, systems, and devices. The 3GPP LTE is the name given to a project to improve the Universal Mobile Telecommunications System ("UMTS") mobile phone or device standard to cope with future requirements. In one aspect, UMTS has been modified to provide support and specification for the Evolved Universal Terrestrial Radio Access ("E-UTRA") and Evolved Universal Terrestrial Radio Access Network ("E-UTRAN"). E-UTRAN is another non-limiting example of a telecommunications standard with which D2D communication may be used.

Device to device (D2D) communications provide proximity-based applications and services, representing an emerging social-technological trend. The introduction of a Proximity Services (ProSe) capability in LTE allows the 3GPP industry to serve this developing market, and, at the same time, serve the needs of several Public Safety communities that are jointly committed to LTE. The current assumptions related to D2D communication is that a wireless terminal within network coverage uses resources for D2D discovery and communication assigned by the controlling node. If the wireless terminal is out of network coverage, it may use pre-assigned resources for communications.

D2D services include ProSe Direct Communication (e.g., D2D communication, sidelink direct communication) and ProSe Direct Discovery (e.g., D2D discovery, sidelink direct discovery). ProSe Direct Communication is thus a mode of communication whereby two wireless terminals may communicate with each other directly over the PC5 interface (See, e.g., 3GPP TS 23.303 VER 12.0.0, which is incorporated herein by reference in its entirety). ProSe Direct Communication is supported when the wireless terminal is served by E-UTRAN and when the wireless terminal is outside of E-UTRA coverage. A transmitter of the wireless terminal transmits Scheduling Assignments (SA) to indicate the resources it is going to use for data transmission to the receiver wireless terminal involved in the D2D communication.

FIG. 11 shows the protocol stack for the user plane, where PDCP, RLC and MAC sublayers (terminate at the other UE) performs various the functions, such as (for example) header compression and HARQ retransmissions.

A ProSe-enabled wireless terminal may operate in two modes for resource allocation. In Mode 1 the network node (e.g., eNodeB) allocates the resources to be used for the device-to-device (D2D) communication. In D2D Mode 1, the wireless terminal needs to be RRC_CONNECTED in order to transmit data. Moreover, the wireless terminal requests transmission resources from the eNB. The eNB schedules transmission resources for transmission of scheduling assignment(s) and data. Further, the wireless terminal sends a scheduling request (D-SR or Random Access) to the eNB followed by a buffer status report (BSR). Based on the BSR the eNB can determine that the wireless terminal has data for a ProSe Direct Communication transmission and estimate the resources needed for transmission.

In D2D Mode 2 the wireless terminal autonomously selects the radio resources to be used for D2D communication. In particular, a wireless terminal on its own selects resources from resource pools to transmit scheduling assignment and data.

A wireless terminal is considered in-coverage if it has a serving cell (i.e. the UE is RRC_CONNECTED or is camping on a cell in RRC_IDLE). If the wireless terminal is in coverage it may use mode 1 if the eNB configures the wireless terminal to use Mode 1. A wireless terminal is said to be out of coverage it can only use Mode 2. However, if the wireless terminal is in coverage it may use Mode 2 if the eNB configures the wireless terminal to use Mode 2. If the wireless terminal is in coverage it shall use only the mode indicated by eNB configuration unless an "exceptional case" occurs. When an exceptional case occurs the wireless terminal may be allowed to use Mode 2 temporarily even though it was configured to use mode 1.

As understood from the foregoing, the resource pool used for reception of a Scheduling Assignment when the wireless terminal is in coverage is configured by the eNB via RRC, in dedicated or broadcast signaling. However, the resource pool used for transmission of Scheduling Assignment when the wireless terminal is in coverage may be configured by the eNB via RRC if Mode 2 resource allocation is used. The SA resource pool used for transmission when the wireless terminal is in coverage is not known to the wireless terminal if Mode 1 resource allocation is used. The eNB schedules the specific resource(s) to use for Scheduling Assignment transmission if Mode 1 resource allocation is used. The specific resource assigned by the eNB is within the resource pool for reception of Scheduling Assignment that is provided to the wireless terminal.

The radio resource pool used for reception of Scheduling Assignments when the wireless terminal is out of coverage is pre-configured. Similarly, the resource pool used for transmission of Scheduling Assignments when the wireless terminal is out of coverage is pre-configured.

In order to perform communication even when some wireless terminals are in-coverage and some wireless terminals are out of coverage, all wireless terminals (i.e. both in and out of coverage) should monitor the resource pool for Scheduling Assignment which is the union of the resource pools used for transmission of Scheduling Assignment in all (or some of the when in-coverage) cells and transmission of Scheduling Assignment out of coverage.

To date several popular distributed resource allocation algorithms have been suggested for resource allocation in device-to-device (D2D) Mode 2 communications. Among the proposed distributed resource allocation algorithms are random resource selection, Randomized Resource Patterns for Transmission (RPT) selection (RRPT), and Carrier Sense Multiple Access With Scheduling Assignment (SA) Blind Decoding (CSMA/SA). Utilization of one universally-applied resource access/allocation method may be problematic and inefficient.

What is needed, therefore, are methods, apparatus, and/or techniques for allocating radio resources for sidelink direct communications.

SUMMARY

One embodiment of the present invention discloses a wireless terminal comprising a processor configured to determine a set of plural pools of resources, to select a pool of resources from a set of plural pools of resources, and to transmit a sidelink direct transmission data using resources of the pool.

In an example embodiment and mode the wireless terminal further comprises radio frequency circuitry which facilitates communication over a first radio interface with a radio access node when the wireless terminal is within the coverage of the node and over a second radio interface with another wireless terminal.

In an example embodiment and mode the wireless terminal further comprises a memory configured to store information specifying the set of the plural pools. In an example implementation the information specifying the set of the plural pools is preconfigured. In an example implementation the information specifying the set of the plural pools is configured by a communication network.

In an example embodiment and mode the processor is configured to select the pool of resources on a basis of a priority. In an example embodiment and mode another one or more of the plural resource pools is associated with a different priority.

In an example embodiment and mode one or more of the plural resource pools is associated with a priority.

In an example embodiment and mode the priority pertains to a characteristic of the sidelink direct transmission.

In an example embodiment and mode the processor is further configured to obtain the priority from a higher layer. In an example embodiment and mode the processor is further configured to obtain the priority from a higher layer application executed by the wireless terminal.

In an example embodiment and mode the priority is in accordance with one or more of the following: access type whereby different access types are afforded different access group classifications; priority type whereby different access types are afforded different priority group classifications; service type whereby different access types are afforded different service group classifications; identification type whereby different access types are afforded different identification group classifications.

In an example embodiment and mode the processor is further configured to select one or more radio resource(s) from the selected pool of resources, the one or more radio resource(s) being used for the sidelink direct transmission data. In an example implementation the processor is configured to select a selection technique selected from plural selection techniques, wherein the selection technique is utilized to select the one or more radio resource(s) from the selected pool of resources, and wherein the selection of the selection technique is dependent upon a number of other wireless terminals are involved in sidelink direct transmission and how many resources for sidelink direct transmission are available to those other wireless terminals.

In another of its aspects the technology disclosed herein concerns a method in a wireless terminal which comprises determining a set of plural pools of resources; selecting a pool of resources from the set of plural pools of resources; and transmitting a sidelink direct transmission data using the pool of resources.

In an example embodiment and mode the method further comprises storing in a memory information specifying the set of the plural pools.

In an example embodiment and mode the information specifying the set of the plural pools is preconfigured. In an example embodiment and mode the information specifying the set of the plural pools is configured by a communication network.

In an example embodiment and mode the method further comprises selecting one or more radio resource(s) from the pool of resources, the one or more radio resource(s) being used for the sidelink direct transmission data.

In an example embodiment and mode the method further comprises selecting from the selected pool a radio resource for use in the sidelink direct transmission.

In an example embodiment and mode the method further comprises selecting the pool of resources on a basis of a priority.

In an example embodiment and mode another one or more of the plural resource pools is associated with a different priority.

In an example embodiment and mode the priority pertains to a characteristic of the sidelink direct transmission.

In an example embodiment and mode the method further comprises obtaining the priority from a higher layer.

In an example embodiment and mode the method further comprises obtaining the priority from a higher layer application executed by the wireless terminal.

In an example embodiment and mode the priority is in accordance with one or more of the following: access type whereby different access types are afforded different access group classifications; priority type whereby different access types are afforded different priority group classifications; service type whereby different access types are afforded different service group classifications; identification type whereby different access types are afforded different identification group classifications.

In another of its aspects the technology disclosed herein concerns a method in a wireless terminal of a communications network which selectively communicates over a first radio interface with a radio access node when the wireless terminal is within coverage of the node. In an example embodiment and mode the method comprises making a first selection of a selected pool from a set of plural pools of radio resources; making a second selection of a selected radio resource from the selected pool; and, scheduling a sidelink direct transmission with another wireless terminal using the selected radio resource.

In an example embodiment and mode the method further comprises storing an identification of the set of the plural pools in a memory. In an example implementation the method further comprises preconfiguring the identification of the set of the plural pools in the memory. In an example implementation the method further comprises the communications network configuring the identification of the set of the plural pools in the memory.

In an example embodiment and mode the method further comprises making the first selection on a basis of group classification. In an example embodiment and mode one or more of the plural resource pools is associated with a group classification.

In an example embodiment and mode the group classification pertains to a characteristic of the sidelink direct transmission.

In an example embodiment and mode the method further comprises obtaining the group classification used as the basis of the first selection from a higher layer. In an example embodiment and mode the method further comprises obtaining the group classification used as the basis of the first selection from a higher layer application executed by the wireless terminal In an example embodiment and mode the method further comprises obtaining from the higher layer application an index which indicates the selected pool.

In an example embodiment and mode the group classification is in accordance with access type whereby different access types are afforded different access group classifications.

In an example embodiment and mode the group classification is in accordance with priority type whereby different access types are afforded different priority group classifications.

In an example embodiment and mode the group classification is in accordance with service type whereby different access types are afforded different service group classifications.

In an example embodiment and mode the group classification is in accordance with identification type whereby different access types are afforded different identification group classifications.

In an example embodiment and mode the method further comprises making a third selection of a second selection technique selected from plural selection techniques. In an example implementation the third selection may be dependent upon a number of other wireless terminals are involved in sidelink direct transmission and how many radio resources for sidelink direct transmission are available to those other wireless terminals. In an example implementation the plural selection techniques comprise random access, ALOHA, slotted ALOHA, and Carrier Sense Multiple Access (CSMA).

In an example embodiment and mode wherein the sidelink direct transmission is a transmission of a scheduling assignment.

In an example embodiment and mode the sidelink direct transmission is a transmission of data between the wireless terminal and the another wireless terminal.

In one of its aspects the technology disclosed herein concerns a wireless terminal of a communications network. The wireless terminal comprises a processor configured to make a first selection of a selected pool from a set of plural pools of radio resources; to make a second selection of a selected radio resource from the selected pool; and, to schedule a sidelink direct transmission over the second interface using a radio resource of the selected pool.

In an example embodiment and mode the wireless terminal further comprising a memory configured to store an identification of the set of the plural pools. In an example implementation the identification of the set of the plural pools is preconfigured in the memory. In another example implementation the identification of the set of the plural pools is configured by the communications network.

In an example embodiment and mode the processor is configured to make the first selection on a basis of group classification. In an embodiment and mode one or more of the plural resource pools is associated with a group classification.

In an example embodiment and mode the group classification pertains to a characteristic of the sidelink direct transmission.

In an example embodiment and mode the processor is further configured to obtain the group classification used as the basis of the first selection from a higher layer. In an example embodiment and mode the higher layer may comprise a higher layer application of the wireless terminal. In an example implementation, the processor is further configured to obtain from the higher layer application an index which indicates the selected pool.

In an example embodiment and mode the group classification is in accordance with access type whereby different access types are afforded different access group classifications.

In an example embodiment and mode the group classification is in accordance with priority type whereby different access types are afforded different priority group classifications.

In an example embodiment and mode the group classification is in accordance with service type whereby different access types are afforded different service group classifications.

In an example embodiment and mode the group classification is in accordance with identification type whereby different access types are afforded different identification group classifications.

In an example embodiment and mode the processor is configured to make a third selection of a second selection technique selected from plural selection techniques. In an example implementation the third selection is dependent upon a number of other wireless terminals are involved in sidelink direct transmission and how many radio resources for sidelink direct transmission are available to those other wireless terminals. In an example implementation the plural selection techniques comprise random access, ALOHA, slotted ALOHA, and Carrier Sense Multiple Access (CSMA).

In an example embodiment and mode the sidelink direct transmission is a transmission of a scheduling assignment.

In an example embodiment and mode the sidelink direct transmission is a transmission of data between the wireless terminal and the another wireless terminal.

In another of its aspects the technology disclosed herein concerns a method in a wireless terminal of a communications network which selectively communicates over a first radio interface with a radio access node when the wireless terminal is within coverage of the node. The method comprises providing a set of plural pools of resources; and selecting a radio resource from one of the plural pools of resources for use by the wireless terminal in communication over a second radio interface with another wireless terminal.

In an example embodiment and mode, the method further comprises configuring the set whereby differing pools of the set are eligible for assignment in accordance with differing group classifications, and wherein each group classifications pertain to a characteristic of the sidelink direct transmission.

In an example embodiment and mode, the group classification is in accordance with one or more of the following: priority type whereby different access types are afforded different priority group classifications; service type whereby different access types are afforded different service group classifications; and identification type whereby different access types are afforded different identification group classifications In another of its aspect the technology disclosed herein concerns a node of a communications network. The node comprises a transmitter and a processor. The processor is configured to define a set of plural pools of radio resources from which the wireless terminal may select a selected radio resource for scheduling a sidelink direct transmission to another wireless terminal.

In an example embodiment and mode, the set is defined whereby differing ones of the plural pools are eligible for selection by the wireless terminal on a basis of a group classification. In an example embodiment and mode the group classification is dependent upon a characteristic of the sidelink direct transmission. In an example embodiment and mode the transmitter is configured to transmit an indication of the set to the wireless terminal over a radio interface.

In another of its aspect the technology disclosed herein concerns a node of a communications network. The node comprises a processor which is configured to configure a set of plural pools of radio resources for use by the wireless terminal in communication with another wireless terminal. In an example embodiment and mode the set is configured whereby differing pools of the set are eligible for assignment in accordance with differing group classifications. In an example embodiment and mode each group classifications pertains to a characteristic of the sidelink direct transmission.

In another of its aspects the technology disclosed herein concerns a method in a node of a communications network which communicates over a first radio interface with a wireless terminal when the wireless terminal is within coverage of the node. The method comprises configuring a set of plural pools of radio resources for use by the wireless terminal in communication with another wireless terminal, and downloading an indication of the set over the first radio interface to the wireless terminal. In an example embodiment and mode the set is configured whereby differing pools of the set are eligible for assignment in accordance with differing group classifications. In an example embodiment and mode each group classifications pertains to a characteristic of the sidelink direct transmission.

In an example embodiment and mode, each pool of the set is pre-assigned to be eligible for selection for one or more group classifications.

In an example embodiment and mode, at least one pool of the set is pre-assigned to be eligible for selection for only one group classification.

In an example embodiment and mode, each pool of the set is pre-assigned to be eligible for selection for only one group classification.

In an example embodiment and mode, at least one pool of the set is pre-assigned to be eligible for selection for a subset of plural but less than all group classifications.

In an example embodiment and mode, each pool of the set is pre-assigned to be eligible for selection for a different combination of group classifications.

In an example embodiment and mode, at least one pool of the set is pre-assigned to be eligible for selection for all predetermined group classifications.

In another of its aspects the technology disclosed herein concerns a method in a node of a communications network comprising configuring a set of plural pools of resources from which a wireless terminal may select a selected radio resource for scheduling a sidelink direct transmission over a radio second interface to another wireless terminal. In an example embodiment and mode the set is configured whereby differing ones of the plural pools are eligible for selection by the wireless terminal on a basis of a group classification. In an example embodiment and mode the group classification is dependent upon a characteristic of the sidelink direct transmission. The method further comprises broadcasting information to the wireless terminal which enables the wireless terminal to be configured with the plural pools.

In another of its aspects the technology disclosed herein concerns a method in a node of a communications network. The method comprises configuring a set of plural pools of resources from which a wireless terminal may select a selected radio resource for scheduling a sidelink direct transmission over a radio second interface to another wireless terminal. The set is configured whereby differing ones of the plural pools are eligible for selection by the wireless terminal on a basis of a group classification. The group classification is dependent upon a characteristic of the sidelink direct transmission. The method further comprises broadcasting information to the wireless terminal which enables the wireless terminal to be configured with the plural pools.

In an example embodiment and mode the method further comprises defining the set whereby differing ones of the plural pools are eligible for selection by the wireless terminal on a basis of a group classification, the group classification being dependent upon a characteristic of the sidelink direct transmission.

In another of its aspects the technology disclosed herein concerns a method in a node of a communications network. The method comprises broadcasting to a wireless terminal information which enables the wireless terminal to be configured with plural pools of resources, wherein a selected pool is selected by the wireless terminal from a set of the plural pools of resources for a scheduling assignment (SA) transmission of a direct communication session; resources are selected by the wireless terminal from the selected pool of resources for the scheduling assignment (SA) transmission of the direct communication session; a selected pool is selected by a wireless terminal from a set of plural pools of resources for a data transmission of the direct communication session; and resources are selected by the wireless terminal from the selected pool of resources for the data transmission of the direct communication session.

In another of its aspects the technology disclosed herein concerns a wireless terminal comprising a processor which is configured or programmable to take part in a direct communication session involving, configured by, or initiated by an upper layer entity. The processor is configured or programmable to select a selected pool from a set of plural pools of resources for direct communication scheduling assignment (SA) transmission; to select resources from the selected pool of resources for direct communication SA transmission; to select a selected pool from a set of plural pools of resources for direct communication data transmission; and, to select resources from the selected pool of resources for direct communication data transmission.

In an embodiment and mode at least one of plural pools of resources is preconfigured. In another embodiment and mode the plural pools of resources are configured by information broadcasted by a radio access node.

In an embodiment and mode the resources comprise time-frequency resources, and the resources for the direct communication SA transmission and the direct communication data transmission are synchronized with a synchronization signal.

In an embodiment and mode the processor is further configured to obtain, from an upper layer, information which serves a basis to select the selected resource pool for the direct communication session. For example, the processor may be configured to obtain from an upper layer entity in the wireless terminal the information which serves a basis to select the selected resource pool for the direct communication session. In an example implementation the information indicates the selected pool for the direct communication session. In an example implementation the information indicates an access type for the direct communication session.

In another of its aspects the technology disclosed herein concerns a method in a wireless terminal which participates in a sidelink direct communication session with another wireless terminal. In an example embodiment and mode the method comprises selecting a selected pool from a set of plural pools of resources for a scheduling assignment (SA) transmission of the direct communication session; selecting resources from the selected pool of resources for the scheduling assignment (SA) transmission of the direct communication session; selecting a selected pool from a set of plural pools of resources for a data transmission of the direct communication session; and selecting resources from the selected pool of resources for the data transmission of the direct communication session.

In an example embodiment and mode at least one of plural pools of resources is preconfigured. In another example embodiment and mode the plural pools of resources are configured by information broadcasted by a radio access node.

In an example embodiment and mode the resources comprise time-frequency resources, and the resources for the direct communication SA transmission and for the direct communication data transmission are synchronized with a synchronization signal.

In an example embodiment and mode the method further comprises obtaining, from an upper layer, information which serves as a basis to select the selected resource. For example, the method may comprise obtaining from an upper layer entity in the wireless terminal the information which serves a basis to select the selected resource pool for the direct communication session. In an example implementation the information indicates the selected pool for the direct communication session. In an example implementation the information indicates an access type for the direct communication session.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

FIG. 2 is a diagrammatic view showing various examples types of "groups" for which a group-based resource pool set may be structured or configured according to an example embodiment and mode.

FIG. 7 is a schematic view of an example network node that configures and downloads or broadcasts a group-based resource pool set to one or more wireless terminals.

FIG. 8 is a flowchart depicting basic, example acts or steps involved in a generic method of node of a communication network which prepares a set of pools of radio resources for a device-to-device (D2D) wireless terminal according to an example embodiment and mode.

DETAILED DESCRIPTION

Figure 1:
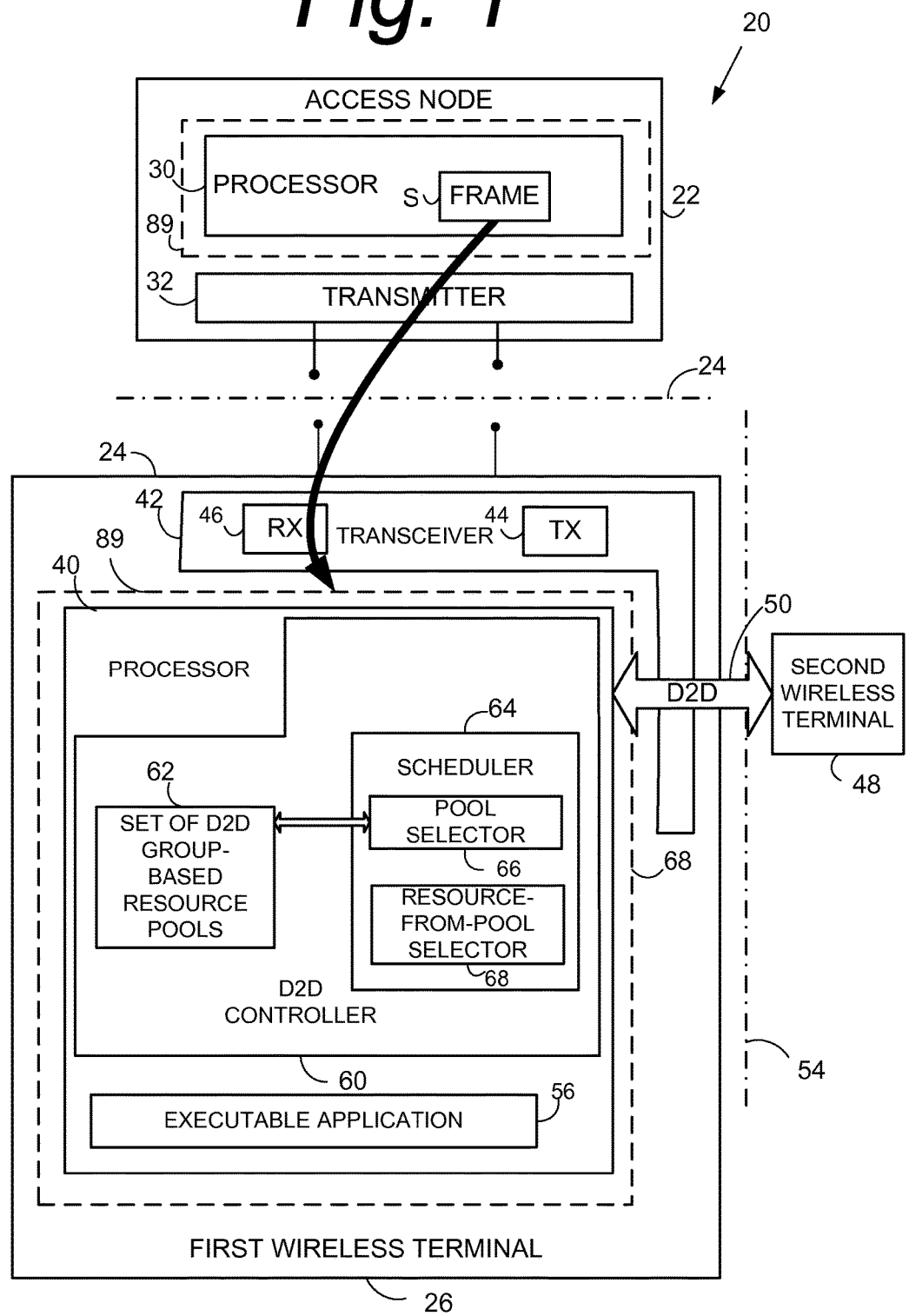
FIG. 1 is a schematic view of an example generic embodiment of a radio communications network in which a wireless terminal participating in device-to-device (D2D) communications selects a pool of radio resources from a set of pools.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

In one of its aspects the technology disclosed herein concerns a wireless terminal comprising a processor which may be configured to determine a set of plural pools of resources; to select a pool of resources from a set of plural pools of resources; and to transmit a sidelink direct transmission data using the pool of resources.

In an example embodiment and mode the wireless terminal further may comprise a memory configured to store information specifying the set of the plural pools of resources.

In an example embodiment and mode the information specifying the set of the plural pools of resources may be preconfigured.

In an example embodiment and mode the information specifying the set of the plural pools of resources may be configured by a communication network.

In an example embodiment and mode the processor may be further configured to select one or more radio resource(s) from the pool of resources, the one or more radio resource(s) being used for the sidelink direct transmission data.

In another of its aspects the technology disclosed herein concerns a method in a wireless terminal which may comprise determining a set of plural pools of resources; selecting a pool of resources from a set of plural pools of resources; and transmitting a sidelink direct transmission data using the pool of resources.

In an example embodiment and mode the method may further comprise storing information specifying the set of the plural pools of resources.

In an example embodiment and mode the information specifying the set of the plural pools of resources may be preconfigured.

In an example embodiment and mode the information specifying the set of the plural pools of resources may be configured by a communication network.

In an example embodiment and mode the method may further comprise selecting one or more radio resource(s) from the pool of resources, the one or more radio resource(s) being used for the sidelink direct transmission data.

In another of its aspects the technology disclosed herein concerns a node communicating with a wireless terminal, which may comprise a processor which is configured to determine a set of plural pools of resources from which a pool of resources is to be selected by the wireless terminal; and to broadcast information specifying the set of plural pools of resources.

In another of its aspects the technology disclosed herein concerns a method in a node communicating with a wireless terminal, which may comprise determining a set of plural pools of resources from which a pool of resources is to be selected by the wireless terminal; and broadcasting information specifying the set of plural pools of resources.

In another of its aspects the technology disclosed herein concerns a wireless terminal comprising a processor which may be configured to determine a set of plural pools of resources; to select a pool of resources from a set of plural pools of resources on a basis of a priority; and to transmit a sidelink direct transmission data using the pool of resources.

In another of its aspects the technology disclosed herein concerns a wireless terminal comprising a processor which may be configured to determine a set of plural pools of resources; to select a pool of resources from a set of plural pools of resources to transmit a sidelink direct transmission data using the pool of resources. One or more of the plural pools of resources may be associated with a priority. Another one or more of the plural pools of resources may be associated with a different priority.

In another of its aspects the technology disclosed herein concerns a wireless terminal comprising a processor which may be configured to determine a set of plural pools of resources; to select a pool of resources from a set of plural pools of resources; to transmit a sidelink direct transmission data using the pool of resources; and to obtain the priority from a higher layer.

In another of its aspects the technology disclosed herein concerns a wireless terminal comprising a processor which may be configured to determine a set of plural pools of resources; to select a pool of resources from a set of plural pools of resources; to transmit a sidelink direct transmission data using the pool of resources; and to obtain the priority from a higher layer application executed by the wireless terminal.

In another of its aspects the technology disclosed herein concerns a node communicating with a wireless terminal, which may comprise a processor configured to configure, to the wireless terminal, information specifying a priority.

As used herein, the term "device-to-device ("D2D") communication" can refer to a mode of communication between or among wireless terminals that operate on a cellular network or other telecommunications system in which the communication data traffic from one wireless terminal to another wireless terminal does not pass through a centralized base station or other device in the cellular network or other telecommunications system. As explained above, device-to-device (D2D) communication is also known by the more recent term "sidelink direct communication". Communication data is sent using communication signals and can include voice communications or data communications intended for consumption by a user of a wireless terminal Communication signals may be transmitted directly from a first wireless terminal to a second wireless terminal via D2D communication. In various aspects, all, some or none of the control signaling related to the D2D packet transmission may be managed or generated by the underlying core network or base station. In additional or alternative aspects, a receiver user equipment terminal may relay communication data traffic between a transmitter user equipment terminal and one or more additional receiver user equipment terminals.

As used herein, the term "core network" can refer to a device, group of devices, or sub-system in a telecommunication network that provides services to users of the telecommunications network. Examples of services provided by a core network include aggregation, authentication, call switching, service invocation, gateways to other networks, etc.

As used herein, the term "wireless terminal" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smart phones, personal digital assistants ("PDAs"), laptop computers, netbooks, e-readers, wireless modems, etc.

As used herein, the term "access node", "node", or "base station" can refer to any device or group of devices that facilitates wireless communication or otherwise provides an interface between a wireless terminal and a telecommunications system. A non-limiting example of a base station can include, in the 3GPP specification, a Node B ("NB"), an enhanced Node B ("eNB"), a home eNB ("HeNB") or some other similar terminology. Another non-limiting example of a base station is an access point. An access point may be an electronic device that provides access for wireless terminal to a data network, such as (but not limited to) a Local Area Network ("LAN"), Wide Area Network ("WAN"), the Internet, etc. Although some examples of the systems and methods disclosed herein may be described in relation to given standards (e.g., 3GPP Releases 8, 9, 10, 11, and/or 12), the scope of the present disclosure should not be limited in this regard. At least some aspects of the systems and methods disclosed herein may be utilized in other types of wireless communication systems.

As used herein, the term "telecommunication system" or "communications system" can refer to any network of devices used to transmit information. A non-limiting example of a telecommunication system is a cellular network or other wireless communication system.

As used herein, the term "cellular network" can refer to a network distributed over cells, each cell served by at least one fixed-location transceiver, such as a base station. A "cell" may be any communication channel that is specified by standardization or regulatory bodies to be used for International Mobile Telecommunications-Advanced ("IMTAdvanced"). All or a subset of the cell may be adopted by 3GPP as licensed bands (e.g., frequency band) to be used for communication between a base station, such as a Node B, and a UE terminal. A cellular network using licensed frequency bands can include configured cells. Configured cells can include cells of which a UE terminal is aware and in which it is allowed by a base station to transmit or receive information.

FIG. 1 shows an example communications system 20 wherein radio access node 22 communicates over a first air or radio interface 24 (such as the Uu interface, for example) with wireless terminal 26 when first wireless terminal 26 is within coverage of node 22, e.g., within coverage of a cell served by node 22. The node 22 comprises node processor 30 and node transmitter 32. The first wireless terminal 26 comprises terminal processor 40 and terminal radio frequency circuitry or transceiver 42. The terminal transceiver 42 typically comprises terminal transmitter circuitry 44 and terminal receiver circuitry 46.

In general operation node 22 and first wireless terminal 26 communicate with each other across radio interface 24 using "frames" of information that may be typically formatted, prepared, and/or allocated resources for transmission based on signaling whose origins lie within the scheduler of node 22. In Long Term Evolution (LTE) a frame, which may have both downlink portion(s) and uplink portion(s), is communicated between the node and the wireless terminal. Each LTE frame may comprise plural subframes. In the time domain, each LTE subframe is divided into two slots. The transmitted signal in each slot is described by a resource grid comprised of resource elements (RE). In case of communications between a network node such as a base station and a wireless terminal, synchronization signal is transmitted from the base station to the wireless terminals to a define time-frequency frame. For example, a PSS (Primary Synchronization Signal) and a SSS (Secondary Synchronization signal) are broadcasted from the base station as synchronization signal.

Long Term Evolution (LTE) defines a number of downlink physical channels which carry information received from Medium Access Control (MAC) and higher layers. In Long Term Evolution (LTE) no dedicated data channels are used, instead shared channel resources are used in both downlink and uplink. For example, the Physical Downlink Shared Channel (PDSCH) is the main physical channel used for unicast data transmission, and is also used for transmission of paging information. These shared resources are controlled by one or more schedulers that assign(s) different parts of the downlink and uplink shared channels to different wireless terminals for reception and transmission respectively. The assignments for the shared channels are transmitted in a control region which is provided in the beginning of each downlink subframe. Of the control channels mentioned above, the PDCCH carries the resource assignment for wireless terminals.

When a wireless terminal desires to send information on the uplink to the node 22, the wireless terminal sends a scheduling request to the node 22 followed by a buffer status report (BSR) from which the node 22 can determine that the wireless terminal intends to perform an uplink transmission. Thereafter in a downlink (DL) subframe the node 22 indicates on Physical Downlink Control Channel (PDCCH) what radio resources the wireless terminal may use for its desired uplink transmission, e.g., the node 22 provides an uplink grant for an uplink transmission by the wireless terminal.

As mentioned above, in some instances wireless terminals may communicate with one another without having those communications transmitted through the node 22. Such terminal-to-terminal communications are also called device-to-device (D2D) communications and/or sidelink direct communications. At some times the device-to-device (D2D) communications may be under network control or "in-coverage", meaning that one or more of the wireless terminal involved in the device-to-device (D2D) communications may be within range of radio frequencies utilized by a node or cell of a radio access network (RAN). When the wireless terminal is "in-coverage" care must be taken that use of radio resources of the device-to-device (D2D) communications not cause interference with the other types of communications on-going in the cell, e.g., communications between the node 22 and the wireless terminals served by the node 22.

The terminal transceiver 42 preferably comprises terminal transmitter circuitry 44 and terminal receiver circuitry 46. The receiver 46 of first wireless terminal 26 receives subframe S communicated over radio interface 24 from communications system 20. When in-coverage, in conjunction with device-to-device (D2D) communications the terminal processor 40 may obtain a device-to-device (D2D) grant from the subframe S. The device-to-device (D2D) grant specifies radio resources that first wireless terminal 26 is permitted to use for device-to-device (D2D) communication with another wireless terminal, e.g., second wireless terminal 48. The transmitter 44 of first wireless terminal 26 serves, e.g., to transmit data on the uplink (UL) from first wireless terminal 26 to node 22, but may also serve to transmit device-to-device (D2D) data to another wireless terminal(s), e.g., second wireless terminal 48, using the radio resources permitted by the D2D grant.

When out-of-coverage, the wireless terminal 26 is no longer entitled for device-to-device (D2D) communications to use the network radio resources which are dynamically allocated by node 22. Instead, when out-of-coverage the first wireless terminal 26 must use resources selected by the wireless terminal from pre-configured radio resources for device-to-device (D2D) communications (e.g., with other wireless terminals such as second wireless terminal 48). Thus, being out-of-coverage is an example scenario of a wireless terminal-selected resource mode, rather than a network-selected resource mode. As described above, being out-of-coverage is also an example scenario D2D Mode 2. However, it should be kept in mind that, as explained previously, in certain circumstances Mode 2 with its employment of pre-configured radio resources may be implemented even in an in-coverage situation.

FIG. 1 depicts by arrow 50 the device-to-device (D2D) communications (also known as sidelink direct communications) between first wireless terminal 26 and second wireless terminal 48. The device-to-device (D2D) communications may occur over a second radio interface 54, which may also be known as the PC5 interface. The PC5 interface is described in 3GPP TS 23.303, 3GPP TS 23.303 V12.0.0 (2014-February); 3rd Generation Partnership Project, Technical Specification Group Services and System Aspects; Proximity-based services (ProSe); Stage 2; Release 12, which is incorporated herein by reference in its entirety. In some example embodiments and modes the device-to-device (D2D) communications may comprise a broadcast, e.g., from first wireless terminal 26 to second wireless terminal 48. In other example embodiments and modes the device-to-device (D2D) communications may be a one-to-one transmission/communication. As used herein, the "second" radio interface 54 may be construed as either of these transmission situations. As such, the statement that the first wireless terminal 26 may be in communication over a second radio interface with another wireless terminal encompasses both a broadcast (which may involve the another wireless terminal and also other terminals) as well as a one-to-one communications/transmission.

The device-to-device (D2D) communications between first wireless terminal 26 and second wireless terminal 48 may occur as the result of execution by terminal processor 40 of an executable application that desires or requires such device-to-device (D2D) communications. To this end FIG. 1 further shows first wireless terminal 26 as comprising an example executable application 56 comprising instructions which, when executed, invoke or involve device-to-device (D2D) communications. The executable instructions of application 56 are stored in or on non-transient media. The transmissions requested or originated by executable application 56 may be classified in a number of ways, such as (for example) in terms of access class, priority class (also referred to as priority), service type, or group identifier, as herein further discussed.

FIG. 1 shows terminal processor 40 as comprising or performing functions of device-to-device (D2D) controller 60. The D2D controller 60 is also known as sidelink direct controller 60. The D2D controller 60 is illustrated in FIG. 1 as having access to a memory 62 in which is provided a set of "group-based" resource pools. For simplicity, reference will hereafter be made to "group-based resource pool set" 62 instead of to the memory itself, it being understood that a definition or description of the group-based resource pool set 62 may be stored in the memory. The resources of group-based resource pool set 62 are radio resources which, when within the scope of 3GPP, comprise time-frequency resources which may be synchronized by a D2D synchronization source. As explained herein, by using "group-based" resource pools the terminal processor 40 provides flexible group-based resource pool access methods with more efficient utilization of transmission resources than a single or sole method of device-to-device (D2D) resource allocation.

FIG. 1 further shows that D2D controller 60, and thus terminal processor 40, comprises scheduler 64. The scheduler 64 serves to schedule transmissions over second radio interface 54 between first wireless terminal 26 and second wireless terminal 48 when the wireless terminal operates using sidelink direct communications. Such transmissions may also be in frame format, similar to that described above, with the device-to-device (D2D) communications (e.g., sidelink direct communications) using radio resources as selected from group-based resource pool set 62. Such D2D transmissions may include both D2D scheduling assignments (SA) for the transmission of D2D data between first wireless terminal 26 and first location 28B, as well as the D2D data itself.

FIG. 1 further shows scheduler 64 as comprising pool selector 66 and resource-from-pool selector 68. The pool selector 66, and thus the terminal processor 40 which pool selector 66 comprises, makes a first selection, on a basis of a group classification, of a selected pool from a set of plural pools of radio resources, e.g., from group-based resource pool set 62. The resource-from-pool selector 68, and thus the terminal processor 40 which resource-from-pool selector 68 comprises, makes a second selection of a selected resource from the selected pool. Thereafter, a device-to-device (D2D) transmission is scheduled over second radio interface 54 using the selected radio resource.

The resource pool set 62 has been described as a "group-based" resource pool set. In being group-based, differing pools of group-based resource pool set 62 may be eligible for assignment or selection by pool selector 66 to differing device-to-device (D2D) transmissions. In an example embodiment and mode a device-to-device (D2D) transmission is classified according to group. In some example implementations there may be different types of group classifications, as explained below. As used herein, "priority" may also be used to refer to group classification.

FIG. 2 shows various examples types of "groups" for which the group-based resource pool set 62 may be structured or configured. For example, a device-to-device (D2D) transmission may be classified according to access class type, as shown by the second column of FIG. 2. That is, the device-to-device (D2D) transmission may be classified as either access class 1 (group AC1), access class 2 (group AC2), and so forth up unto access class i (group ACi). Alternatively the device-to-device (D2D) transmission may be classified according to priority type, as shown by the third column of FIG. 2, and thus be classified as either priority class 1 (group PT1), priority class 2 (group PT2), and so forth up unto priority class j (group PTj). As another alternative the device-to-device (D2D) transmission may be classified according to service type, as shown by the third column of FIG. 2, and thus be classified as either service class 1 (group SC1), service class 2 (group SC2), and so forth up to service class k (group SCk). As yet another alternative the device-to-device (D2D) transmission may be classified according to an identifier (ID) as shown by the fourth column of FIG. 2, and thus be classified as either ID class 1 (group ID1), ID class 2 (group ID2), and so forth up to ID class n (group SCn). Whereas some of the groups above are defined by a mapping relationship between some criteria, like access class, and group index, the identifier (ID) of the fourth column may be a direct group index, for which the index is like a blackbox in which any mapping relationship need not necessarily be known. At least one benefit of this hierarchy is to be able to privilege certain classes of communication signals with respect to others, e.g., based on high priority first responder transmission.

Thus, the group to which a D2D transmission belongs may be classified dependent on a characteristic of the device-to-device (D2D) transmission. The characteristic of a group for the device-to-device (D2D) transmission may be gleaned by pool selector 66 from or signaled to pool selector 66 by a higher layer application executed by the wireless terminal, e.g., from executable D2D application 56.

As understood from FIG. 2, in one example embodiment and mode the group classification is in accordance with access type whereby different access types are afforded different access group classifications. In another example embodiment and mode the group classification is in accordance with priority type whereby different access types are afforded different priority group classifications. In yet another example embodiment and mode the group classification is in accordance with service type whereby different access types are afforded different service group classifications. In still another example embodiment and mode the group classification is in accordance with identification type whereby different access types are afforded different identification group classifications.

In each of the example embodiments one or more of the pools in the group-based resource pool set 62 may be structured or configured in accordance with or be associated with the group classification type, e.g., either based on access class, priority type, service type, or identifier. In still yet another example embodiment and mode, the pools in group-based resource pool set 62 may be structured or configured in accordance with or be associated with the plural different group classification types, e.g., e.g., one pool may be associated with and thus assignable an access type group and another pool may be associated with and thus assignable to a service type group, for example. Other combinations of group classification types may be reflected by the composition of group-based resource pool set 62.

Figure 3A:
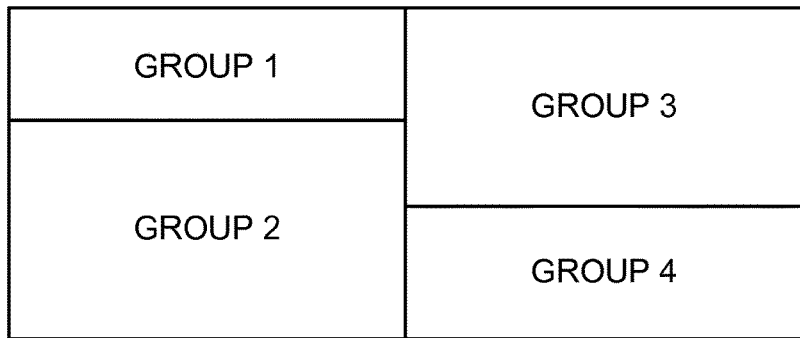
FIG. 3A-FIG. 3C are diagrammatic view depicting differing ways of structuring or configuring a set of pools of radio resources for D2D communication according to differing example embodiments and modes.
Figure 3B:
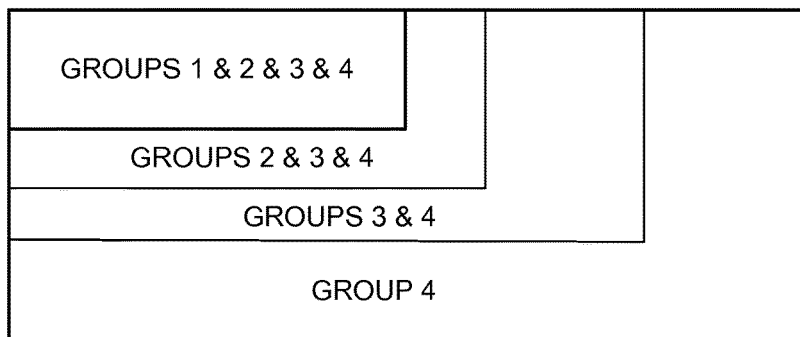
Figure 3C:
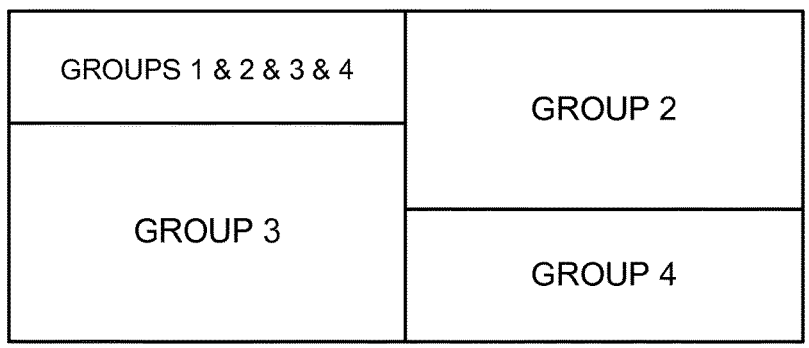

FIG. 3A-FIG. 3C illustrate various example configurations of representative, illustrative, non-limiting example group-based resource pool sets 62. In FIG. 3A-FIG. 3C the group-based resource pool set 62 is represented by the outer rectangle, which is subdivided into other geometrically figured shapes, each of the subdividing geometric shapes representing a pool which comprise the group-based resource pool set 62. Rather than being labeled as "pools" each of the subdividing geometric shapes of FIG. 3A-FIG. 3C are labeled with the groups which are assigned to the respective pools. It should be understood that each pool is a subset of the radio resources of the group-based resource pool set 62.

As illustrated in FIG. 3A-FIG. 3C, each pool of group-based resource pool set 62 is pre-assigned to be eligible for selection for one or more group classifications, e.g., one or more groups. In a non-limiting example embodiment and mode, at least one pool of the set 62 is pre-assigned to be eligible for selection for only one group classification. In this regard, FIG. 3A illustrates an example subset of such example embodiment wherein all pools are only assignable to one group (i.e., each of Group 1, Group 2, Group 3, and Group 4 have their own pool). Thus, in the example embodiment of FIG. 3A there is no common resource pool for plural group classifications. Instead, each resource pool corresponds to a respective group classification, and there are no overlapping pools among different group classifications.

FIG. 3B illustrates an example embodiment and mode wherein at least one pool of the set is pre-assigned to be eligible for selection for a subset of plural but less than all group classifications. There are two such pools in FIG. 3B: a pool shared by Groups 2, 3, and 4; and another pool shared by Groups 3 and 4. FIG. 3B also illustrates an example wherein at least one pool of the set is pre-assigned to be eligible for selection for all predetermined group classifications (e.g., Groups 1, 2, 3 and 4). Thus, in the example embodiments of FIG. 3B and FIG. 3C, there may be common resource pools for different group classifications, and at the same time each group classification may or may not have its own resource pool.

Moreover, it should be understood that in an example embodiment and mode each pool of the set may be pre-assigned to be eligible for selection for a different combination of group classifications.

Figure 4A:
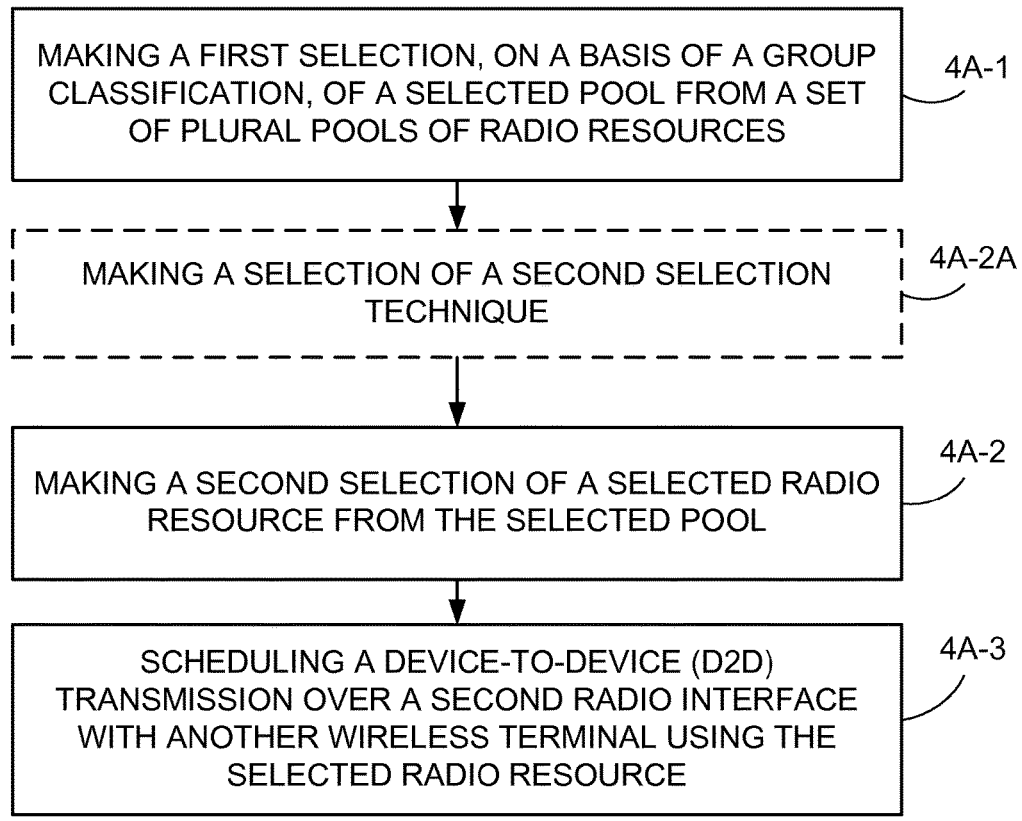
FIG. 4A, FIG. 4B, and FIG. 4C are flowchart depicting basic, example acts or steps involved in generic methods of operating a wireless terminal in device-to-device (D2D) according to an example embodiment and mode.

FIG. 4A depicts basic, example acts or steps involved in a generic method of operating a wireless terminal in device-to-device (D2D) according to an example embodiment and mode. Act 4A-1 comprises the pool selector 66, and thus terminal processor 40, making a first selection, on a basis of a group classification, of a selected pool from a set of plural pools of radio resources. In other words, for the example illustrations of any one of FIG. 3A-3C the group-based resource pool set 62 selects one of the particular subdividing geometric shapes (corresponding to a selected pool) in accordance with the group classification for the sidelink direct communication. Act 4A-2 comprises the resource-from-pool selector 68 making a second selection, e.g., a selection of a selected radio resource from the selected pool at act 4A-1. Act 4A-3 comprises the scheduler 64 performing the act of scheduling a device-to-device (D2D) transmission over second radio interface 54 with another wireless terminal (e.g., second wireless terminal 48) using the selected radio resource.

Figure 5:
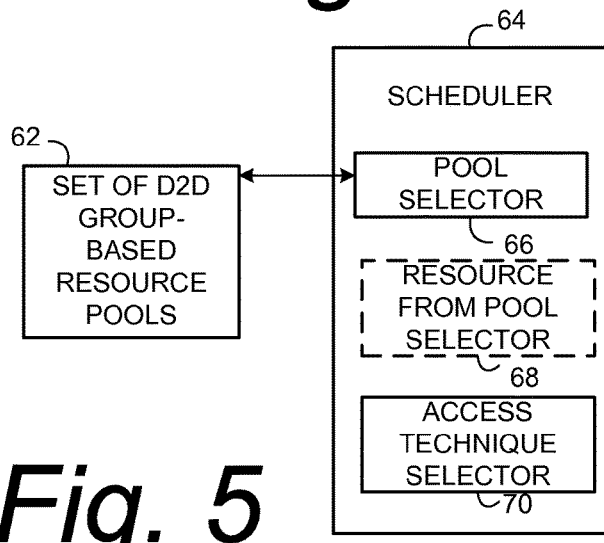
FIG. 5 is a schematic view of portions of a D2D controller according to an example alternative embodiment, and particularly of a scheduler which includes an access technique selector, along with a group-based resource pool set.

As mentioned above, act 4A-2 comprises the resource-from-pool selector 68 making a second selection of a selected radio resource from the selected pool. In an example embodiment and mode, a same selection technique may be consistently employed by scheduler 64 to choose resource(s) from the selected pool. But in another example implementation act 4-2 may comprise an optional sub-act 4A-2A. The optional sub-act 4A-2A (illustrated in broken lines in FIG. 4) may be performed by an optional further unit of scheduler 64, e.g., access technique selector 70 (illustrated in FIG. 5). The optional act 4A-2A comprises making a (third) selection (from among from plural selection techniques) of a second selection technique. In an example implementation the third selection is dependent upon a number of other wireless terminals that are involved in device-to-device (D2D) transmission and how many radio resources for device-to-device (D2D) transmission are available to those other wireless terminals. In an example implementation the plural selection techniques comprise random access, ALOHA (developed by University of Hawaii), slotted ALOHA, and Carrier Sense Multiple Access (CSMA).

After the second selection technique has been chosen by access technique selector 70 as act 4A-2A, then the resource-from-pool selector 68 may use the chosen access technique to perform act 4A-2, selecting the actual resource from the selected pool.

Figure 4B:
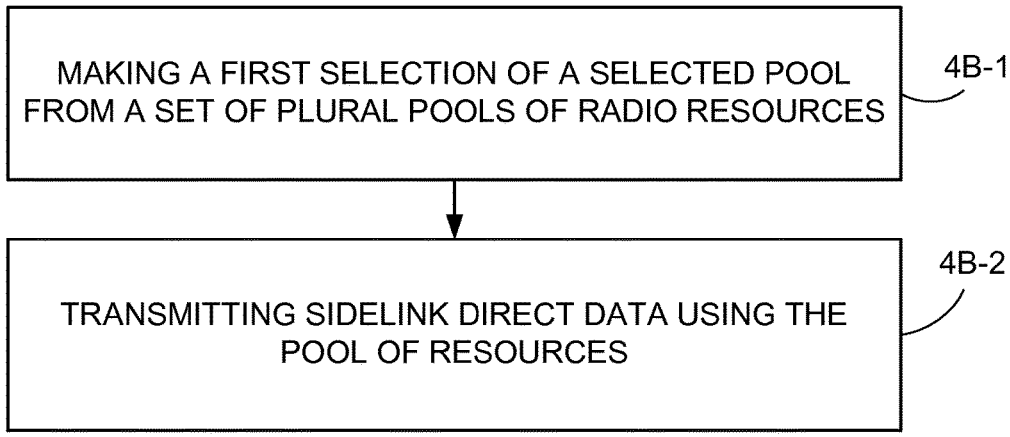

FIG. 4A support and encompass another generic example embodiment shown in FIG. 4B. The example embodiment of FIG. 4B illustrates that FIG. 4A discloses acts such as act 4B-1 and act 4B-2 which may be practiced in the manner shown in FIG. 4B. Act 4B-1 comprises the pool selector 66, and thus terminal processor 40 selecting a pool from a set of plural pools of radio resources. Act 4B-2 comprises transmitting sidelink direct transmission data using the selected pool of resources, e.g., using the pool selected as act 4B-1. As used herein, "sidelink direct transmission data" encompasses or comprises both scheduling assignment (SA) and data of the sidelink direction communication session. Stated differently, act 4B-2 comprises scheduling a device-to-device (D2D) transmission over the second radio interface using a radio resource of the selected pool.

As explained above, the device-to-device (D2D) transmission over the second interface for which the resource is selected (e.g., by the method of FIG. 4A or the method of FIG. 4B) may be either a scheduling assignment or a transmission of data (as required or requested by executable application 56) between the wireless terminal 26 and the other wireless terminal 48. In view of the use of resources from the selected pool(s) for both a scheduling assignment and transmission of data for the device-to-device (D2D) transmission, the technology disclosed herein may alternatively or additionally be described by the example method having representative acts or steps illustrated in FIG. 4C.

Figure 4C:
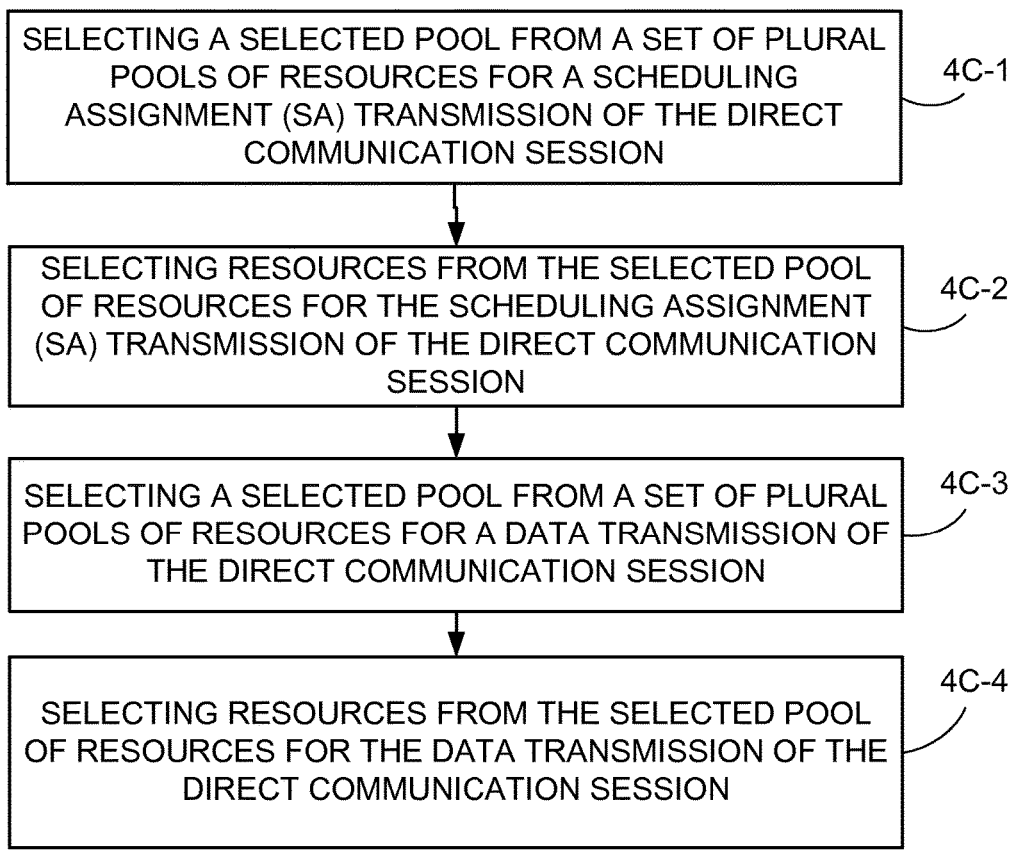

FIG. 4C illustrates thus an alternative expression of a method in a wireless terminal which participates in a direct communication session with another wireless terminal. In the FIG. 4C embodiment and mode, a separate selection of radio resources is made for the scheduling assignment (SA) for the sidelink direct communication and for the data for the sidelink direct communication. Various aspects of the method of FIG. 4C are understandable from the preceding discussion and the method of FIG. 4A and FIG. 4B. In this regard, act 4C-1 comprises selecting a selected pool from a set of plural pools of resources for a scheduling assignment (SA) transmission of the direct communication session. Act 4C-2 comprises selecting resources from the selected pool of resources for the scheduling assignment (SA) transmission of the direct communication session. Act 4C-3 comprises selecting a selected pool from a set of plural pools of resources for a data transmission of the direct communication session. Act 4C-4 comprises selecting resources from the selected pool of resources for the data transmission of the direct communication session. Thus act 4C-1 and act 4C-2 pertain to selection for the assignment (SA) of the sidelink direct communication while act 4B-3 and act 4C-4 pertain to selection for the data of the sidelink direct communication.

In an example embodiment and mode the resources employed in the methods above comprise time-frequency resources. Such resources for the direct communication SA transmission and for the direct communication data transmission may be synchronized with a synchronization signal.

In an example embodiment and mode the method further comprises obtaining, from the upper layer entity (e.g., executable application 56) in the wireless terminal, information which serves as a basis to select the selected resource pool for the direct communication session. In an example implementation the information from the upper layer entity indicates the selected pool for the direct communication session. In an example implementation the information indicates an access type for the direct communication session.

Figure 6:
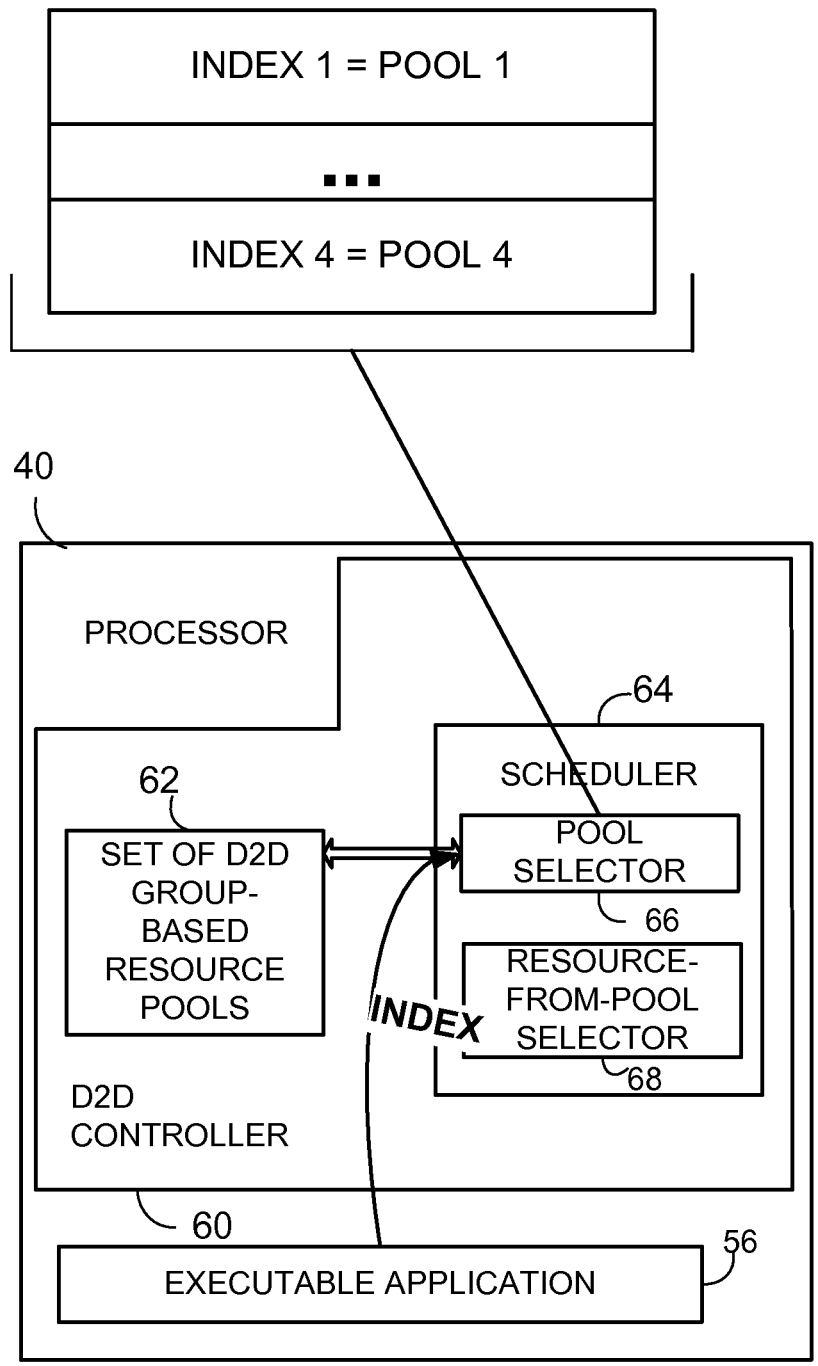
FIG. 6 is a diagrammatic view depicting a pool selector receiving or otherwise acquiring such an index from executable application and selecting a pool based on the index.

In an example implementation, the pool selector 66, and thus terminal processor 40, may obtain from the higher layer application (e.g., executable application 56) an index or other value which simply and/or directly indicates the selected pool. FIG. 6 shows pool selector 66 receiving or otherwise acquiring such an index from executable application 56, and using the received/acquired index to determine which of the pools to select accordingly. For example, FIG. 6 shows that an index=1 signifies that pool 1 is to be selected; index=4 signifies that pool 4 is to be selected.

It was mentioned above that an identification, description, or listing of the set of the plural pools comprising group-based resource pool set 62 is stored in a memory accessible to terminal processor 40. In one example implementation such identification of the set of the plural pools may be preconfigured in the memory, e.g., pre-stored in a memory chip, memory device, or the like comprising first wireless terminal 26.

In another example implementation and illustrated in FIG. 7 and FIG. 8, the identification of the set of the plural pools comprising group-based resource pool set 62 may be configured by the communications network and transmitted to the first wireless terminal 26, e.g., downloaded by broadcast from a network node (e.g., node 22) using an appropriate signal or message over the first radio interface 24. To this end FIG. 7 shows the node processor 30 of node 22 as comprising pool set generator 76, which (as depicted by arrow 78) broadcasts or otherwise downloads/transmits the constituency of the group-based resource pools to the memory of first wireless terminal 26 which stores group-based resource pool set 62. Thus, in the example embodiment and mode of FIG. 7 and FIG. 8 the node 22 broadcasts information to the wireless terminal which enables the wireless terminal to be configured with the plural pools.

The node 22 defines the resource pool set according to some criteria, like access class and service type, so as to do some mapping; or just defines the set with some methods which need not necessarily be defined. In this regard, in some example embodiments it may be that a RAN aspect is particularly covered but not all core network (CN) behaviors. The resource pool may be defined according to prioritizing first responders or according to defining classes of users who pay more for prioritized access.

FIG. 8 shows basic, example acts or steps involved in a generic method of operating the node 22 of FIG. 7, e.g., a node of a communication network which generates or prepares a set of pools of radio resources for a device-to-device (D2D) wireless terminal. Act 8-1 comprises the pool set generator 76 generating or configuring a set of plural pools of radio resources for use by the wireless terminal in communication over a second radio interface with another wireless terminal. As understood from the foregoing, the set is configured so that differing pools of the set are eligible for assignment in accordance with differing group classifications, and each group classifications pertain to a characteristic of the device-to-device (D2D) transmission or communication. Act 8-2 comprises (via node transmitter 32) downloading an indication of the set over the first radio interface to the wireless terminal. Such indication may be the entire constituency of the set itself, or some other key or index recognizable by first wireless terminal 26 for knowing which of several possible sets is to be utilized by the pool selector 66.

Figure 9:
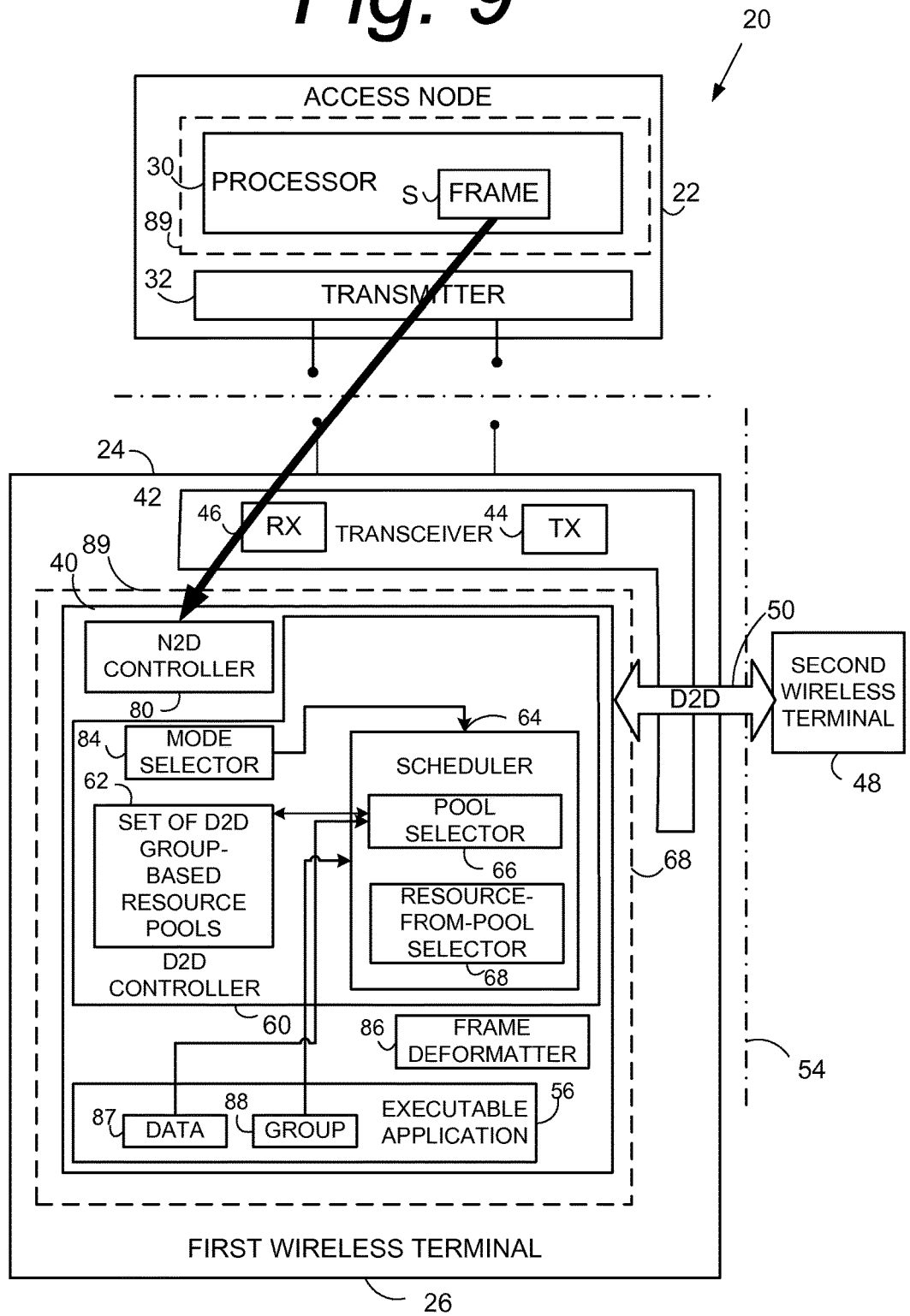
FIG. 9 is a schematic view of an example embodiment of a radio communications network showing a more detailed example implementation of the node and wireless terminal of FIG. 1.

FIG. 9 shows a more detailed example implementation of the node 22 and wireless terminal 30 of FIG. 1. In the more detailed example node processor 30 includes not only D2D controller 60, but Node-to-Device (N2D) controller 80 as well. The Node-to-Device (N2D) controller 80 cooperates in formatting/deformatting of frames of information transmitted over interface 24 between node 22 and first wireless terminal 26, and in the transmission of information on an uplink from first wireless terminal 26 to node 22.

FIG. 9 further shows D2D controller 60 as comprising mode selector 84. The mode selector 84 may participate in determining which of device-to-device (D2D) Mode 1 and device-to-device (D2D) is applicable. For example, mode selector 84 may facilitate determination of whether the first wireless terminal 26 is out of coverage and thus confined to use of radio resources of the group-based resource pool set 62. Detection of network coverage is discussed in, for example, U.S. patent application Ser. No. 14/660,622, filed Mar. 17, 2015, and U.S. Provisional Patent Application 62/013,764, filed Jun. 18, 2014, both of which are entitled "DEVICE-TO-DEVICE RESOURCE ALLOCATION METHODS BASED ON USER EQUIPMENT RADIO FREQUENCY CAPABILITY" and both of which are incorporated herein by reference in their entirety. Alternatively, the Node-to-Device (N2D) controller 80 may receive an indication from node 22 that, despite being in-coverage, under certain circumstances the first wireless terminal 26 is authorized to use D2D Mode 2.

FIG. 9 further shows that, for device-to-device (D2D) communications received from another wireless terminal such as second wireless terminal 48, frame deformatter 86 may be utilized to decode and or de-format the received information so as to be made usable by, e.g., executable application 56.

FIG. 9 also shows that the executable application 56 may supply data 87 and group information 88 to D2D controller 60. The data 87 may be scheduled for transmission by either Mode 1 scheduler 82 or scheduler 64 in accordance with whichever mode is deemed applicable by mode selector 84. The group information 88 may comprise whatever information is used by pool selector 66 to make its pool selection, e.g., an access class, priority type, service type, or identification, as previously discussed. In a simple case illustrated in FIG. 6, the group information 88 may comprise an index which the scheduler 64 may know by prearranged agreement to interpret as corresponding to a particular one of the pools of group-based resource pool set 62.

Thus the technology disclosed herein provides solutions for D2D UEs to access resource pools. Instead of single method being adopted to solve the whole network resource pool access problems, flexible group-based resource pool access methods are used for more efficient utilization of transmission resources. Meanwhile, the introduction of priority-based strategy makes this method offer further higher efficiency and flexibility.

In an example embodiment, the radio access network (RAN) may not necessarily know how a group is formed and may follow a high layer's signaled group ID.

The wireless terminal determines a set of resource pools based on pool information stored in the wireless terminal and broadcasted information of set(s) of resource pools. The wireless terminal determines a set of resource pools based on pool information stored in the wireless terminal or broadcast information of set(s) of resource pools or both (e.g., the wireless terminal may determine resource pools based on pool information stored in the wireless terminal, then the wireless terminal may update this information based on broadcasted information)

In accordance with aspects of the technology disclosed herein, the D2D wireless terminal selects one resource pool for among a set of resource pools based on one or a combination of the following access criteria (higher layer mapping may be finished in the following way or be finished outside RAN). For example:

A higher layer resource pool indication, which can be resource pool index, e.g., resource pool 1, may be signaled from higher layer (e.g., from executable application 56) to indicate that the wireless terminal shall access a certain resource pool directly.

A Group Indication, which can be group index, e.g., group 1, may be stored in the wireless terminal to indicate that the wireless terminal shall access which resource pool by a mapping relationship between group index and resource pool index.

A higher layer priority indication, which can be the priority (access class can be regarded as one type of priority indication from this aspect) index, e.g., group priority 1, signaled from higher layer to indicate that the wireless terminal shall access which resource pool by a mapping relationship between group priority index and resource pool index.

The wireless terminal may randomly select D2D SA transmission resource(s) from the selected resource pool. The UE may select D2D SA transmission resource(s) from the selected resource pool based on a particular access method.

The wireless terminal may randomly select D2D Data transmission resource(s) from the selected resource pool. The UE may select D2D Data transmission resource(s) from the selected resource pool based on a particular access method.

In general, the technology disclosed herein provides a flexible resource pool access method. Group-based resource pool access with flexible resource access methods in each group can have much higher efficiency than the whole network access method. More importantly, priority-based access, including the FIG. 3B resource pool construction scenario, may allow wireless terminals belonging to higher priority groups have more resources to access so as to reduce collision probability, which makes low cost and low complexity pure random access method practical. Further, the FIG. 3B situation involves common resource pools which may offers good backwards compatibility to the current 3GPP resource pool definitions.

It was also mentioned above that the resources of group-based resource pool set 62, within the scope of 3GPP, are time-frequency resources which may be synchronized by a D2D synchronization source. A D2D Synchronization Source transmits at least a D2D synchronization signal (D2DSS). The transmitted D2DSS may be used by a UE to obtain time and frequency synchronization. The D2DSS transmitted by a D2D Synchronization Source which is a base station may be the Rel-8 PSS/SSS. The structure of D2DSS transmitted by D2D Synchronization Sources other than the base station is defined as: D2D Synchronization Sources transmits a D2DSS that may carry the identity and/or type of the D2D Synchronization Source(s), comprises of at least a Primary D2D Synchronization Signal (PD2DSS) which is a Zadoff Chu sequence and may also comprise of a Secondary D2D Synchronization Signal (SD2DSS) which is a M sequence.

A RRC dedicated or broadcast signaling for ProSe is understood with reference to information elements known as IE SystemInformationBlock Type 17, IE ProseCommConfig, IE ProseCommIndication, and others as described in Change Request R2-142829 (3GPP TSG-RAN2 Meeting #86, Seoul, South Korea, 19-23 May 2014) to 3GPP TS 36.331 V12.1.0, 3rd Generation Partnership Project; Technical Specification Group Radio Access Network; Evolved Universal Terrestrial Radio Access (E-UTRA); Radio Resource Control (RRC); Protocol specification, (Release 12), both of which are incorporated herein by reference in their entirety. See, e.g., http://www.3gpp.org/ftp/Meetings_3GPP SYNC/RAN2/Docs/, search R2-142829.zip; the spec. link is http://www.3gpp.org/DynaReport/36331.htm, May 21, 2014.

Figure 10:
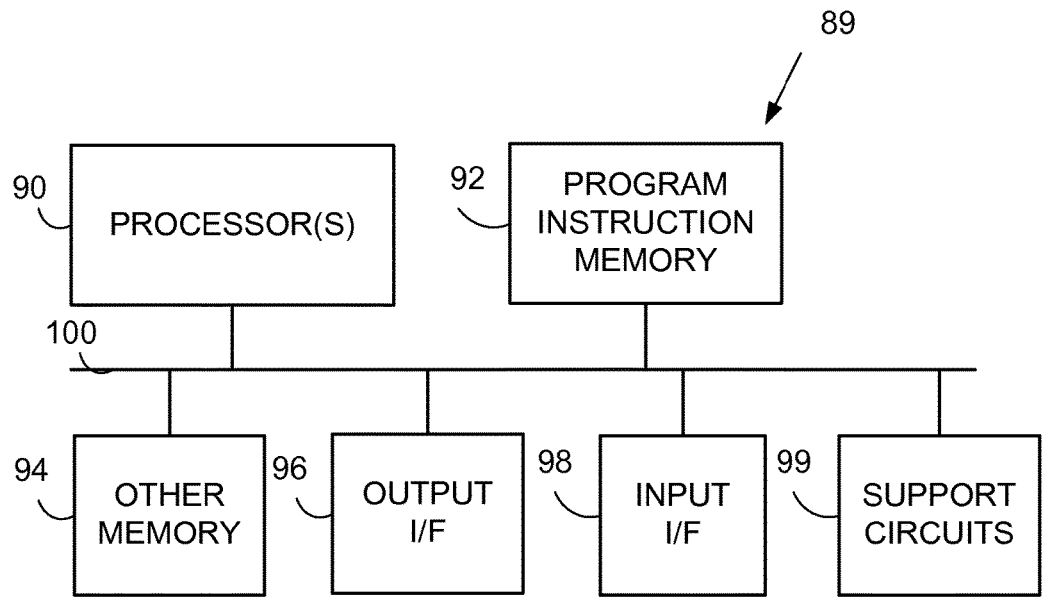
FIG. 10 is a schematic view of example electronic machinery comprising either an example network node or an example wireless terminal.
Figure 11:
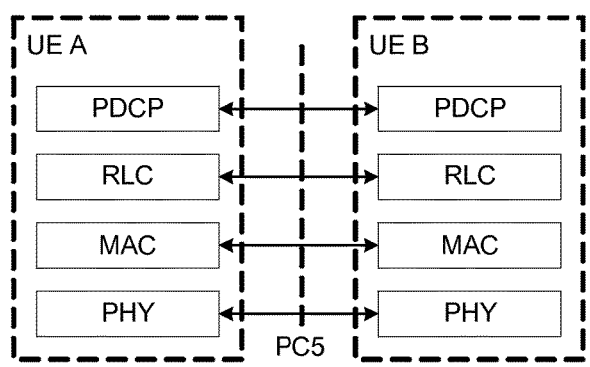
FIG. 11 is a diagrammatic view of User-Plane protocol stack for D2D Communication.

Certain units and functionalities of node 22 and first wireless terminal 26 framed by broken line 89 are, in an example embodiment, implemented by node electronic machinery. Similarly, certain units and functionalities of first wireless terminal 26 framed by broken line are, in an example embodiment, implemented by terminal electronic machinery 68. FIG. 10 shows an example of such electronic machinery, whether node electronic machinery 89 or terminal electronic machinery 89, as comprising one or more processors 90 (which may be node processor 30 or terminal processor 40), program instruction memory 92; other memory 94 (e.g., RAM, cache, etc.); input/output interfaces 96; peripheral interfaces 98; support circuits 99; and busses 100 for communication between the aforementioned units. The electronic machinery may thus take the form of a processor circuit, e.g., a circuit that comprises one or more processor devices such as microprocessors.

The memory 94, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 99 are coupled to the processors 90 for supporting the processor in a conventional manner. These circuits include cache, power supplies, clock circuits, input/output circuitry and subsystems, and the like.

Although the processes and methods of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system, and is capable of being performed using any CPU architecture.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA (s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

As used herein, a Radio Resource Unit (RRU) may be understood by a set of basic physical transmission parameters necessary to support a signal waveform transporting end user information corresponding to a reference service. These physical transmission parameters depend on the multiple access technique being used. In particular, in FDMA (Frequency Division Multiple Access), a radio resource unit is equivalent to a certain bandwidth within a given carrier frequency. In TDMA (Time Division Multiple Access), a radio resource unit is equivalent to a pair of a carrier frequency and a time slot. In CDMA (Code Division Multiple Access), a radio resource unit is defined by a carrier frequency, a code sequence and a power level.

Although the description of wireless terminal has primarily concentrated on the transmitting first wireless terminal 26, it should be understood that the internal structure and operation of other wireless terminals such as second wireless terminal 48 that participate in device-to-device (D2D) communications may be essentially same or similar.

Some the terminology employed for concepts as described herein has been updated or changed in more recent industry documentation, such as the 3GPP Technical Standards, for example. As mentioned above, "device-to-device (D2D)" is now also called "sidelink direct". Some other terminology has also changed, a partial listing appearing in Table 1 below.

TABLE 1

Terminology

| Previous Terminology | New Terminology |
|---|---|
| Schedule assignment SA | PSCCH Physical Sidelink Control Channel |
| PD2DSCH (Phys. D2D Synch. Channel) | PSBCH (Phys. Sidelink Broadcast Channel) |
| D2DSS (D2D synchronization signals) | SLSS (Sidelink Synchronization Signals) |
| D2D Communications or Data Channel | PSSCH (Physical Sidelink Shared Channel) |
| D2D Discovery Channel | DSDCH |

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A user equipment comprising:
   a processor; and
   memory in electronic communication with the processor, wherein instructions stored in the memory are executable to:
     receive broadcast information from a base station, the broadcast information including information indicating a set of plural pools of resources used for transmission, each of the plural pools of resources comprising time-frequency resources;
     select a pool of resources from the set of plural pools of resources; and
     transmit a sidelink direct transmission data using the selected pool of resources, wherein
     the selection comprises:
       (i) in a case where the broadcast information includes information on a priority(s) associated with the set of plural pools of resources, selecting the pool of resources from the set of plural pools of resources based on the associated priority; and
       (ii) in a case where the broadcast information does not include information on the associated priority, selecting the pool of resources from the set of plural pools of resources based on an instruction from an upper layer.

2. The user equipment of claim 1, wherein
   the sidelink direct transmission data comprises sidelink data and sidelink control information for the sidelink data; and
   further instruction stored in the memory is executable to select a first time-frequency resource and a second time-frequency resource from the selected pool of resources, the first time-frequency resource being used for the sidelink control information, and the second time-frequency resource being used for the sidelink data.

3. A method in a user equipment, the method comprising:
   receiving broadcast information from a base station, the broadcast information including information indicating a set of plural pools of resources used for transmission, each of the plural pools of resources comprising time-frequency resources;
   selecting a pool of resources from the set of plural pools of resources; and
   transmitting a sidelink direct transmission data using the selected pool of resources,
   wherein the selection comprises:
     (i) in a case where the broadcast information includes information on a priority(s) associated with the set of plural pools of resources, selecting the pool of resources from the set of plural pools of resources based on the associated priority; and
     (ii) in a case where the broadcast information does not include information on the associated priority, selecting the pool of resources from the set of plural pools of resources based on an instruction from an upper layer.

4. The method of claim 3, wherein
   the sidelink direct transmission data comprises sidelink data and sidelink control information for the sidelink data; and
   the method further comprises selecting a first time-frequency resources and a second time-frequency resource from the selected pool of resources, the first time-frequency resources being used for the sidelink control information, and the second time-frequency resource being used for the sidelink data.

5. A base station comprising:
   a processor; and
   memory in electronic communication with the processor, wherein instructions stored in the memory are executable to:
     determine a set of plural pools of resources used for reception from which a pool of resources is to be selected for a sidelink direct transmission data by a user equipment, each of the plural pools of resources comprising time-frequency resources; and
     transmit broadcast information, the broadcast information including information indicating the set of plural pools of resources, wherein
       (i) in a case where the base station is to cause the user equipment to select the pool of resources from the set of plural pools of resources based on a priority(s) associated with the set of plural pools of resources, the base station causes the broadcast information to include information on the associated priority, and
       (ii) in a case where the base station is to cause the user equipment to select the pool of resources from the set of plural pools of resources based on an instruction from an upper layer, the base station does not cause the broadcast information to include information on the associated priority.

6. The base station of claim 5, wherein
   the sidelink direct transmission data comprises sidelink data and sidelink control information for the sidelink data; and
   each of the plural pools of resources comprises first time-frequency resources used for the sidelink control information, and second time-frequency resource used for the sidelink data.

7. A method in a base station comprising:
   determining a set of plural pools of resources used for reception from which a pool of resources is to be selected for a sidelink direct transmission data by a user equipment, each of the plural pools of resources comprising time-frequency resources; and transmitting broadcast information, the broadcast information including information indicating the set of plural pools of resources, wherein
- (i) in a case where the base station is to cause the user equipment to select the pool of resources from the set of plural pools of resources based on a priority(s) associated with the set of plural pools of resources, the base station causes the broadcast information to include information on the associated priority, and
- (ii) in a case where the base station is to cause the user equipment to select the pool of resources from the set of plural pools of resources based on an instruction from an upper layer, the base station does not cause the broadcast information to include information on the associated priority.

8. The method claim 7, wherein the sidelink direct transmission data comprises sidelink data and sidelink control information for the sidelink data; and each of the plural pools of resources comprises first time-frequency resources used for the sidelink control information, and second time-frequency resource used for the sidelink data.

* * * * *